United States Patent
Aoki et al.

(10) Patent No.: US 12,126,021 B2
(45) Date of Patent: Oct. 22, 2024

(54) POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

(71) Applicant: Panasonic Intellectual Property Management Co., Ltd., Osaka (JP)

(72) Inventors: Yoshinori Aoki, Osaka (JP); Toshinobu Kanai, Hyogo (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 18/114,833

(22) Filed: Feb. 27, 2023

(65) Prior Publication Data

US 2023/0207801 A1    Jun. 29, 2023

Related U.S. Application Data

(63) Continuation of application No. 17/269,740, filed as application No. PCT/JP2019/007694 on Feb. 27, 2019, now Pat. No. 11,626,588.

(30) Foreign Application Priority Data

Aug. 29, 2018 (JP) .................... 2018-160149

(51) Int. Cl.
| | | |
|---|---|---|
| *H01M 4/131* | (2010.01) | |
| *C01G 53/00* | (2006.01) | |
| *H01M 4/505* | (2010.01) | |
| *H01M 4/525* | (2010.01) | |
| *H01M 4/02* | (2006.01) | |

(52) U.S. Cl.
CPC ............ *H01M 4/525* (2013.01); *C01G 53/50* (2013.01); *H01M 4/505* (2013.01); *C01P 2002/52* (2013.01); *C01P 2002/74* (2013.01); *C01P 2002/77* (2013.01); *C01P 2006/40* (2013.01); *H01M 2004/021* (2013.01); *H01M 2004/028* (2013.01)

(58) Field of Classification Search
CPC .............. H01M 4/525; H01M 4/505; H01M 2004/021; H01M 2004/028; H01M 4/131; H01M 10/0525; C01G 53/50; C01P 2002/52; C01P 2002/74; C01P 2002/77; C01P 2006/40; C01P 2002/60; C01P 2002/72; Y02E 60/10
See application file for complete search history.

(56) References Cited

U.S. PATENT DOCUMENTS

2002/0086210 A1    7/2002  Naruoka et al.

FOREIGN PATENT DOCUMENTS

| JP | 2000-30693 A | 1/2000 |
|---|---|---|
| JP | 2000-133262 A | 5/2000 |
| JP | 2002-151076 A | 5/2002 |
| JP | 2007-257885 A | 10/2007 |
| JP | 2018-37380 A | 3/2018 |
| JP | 2018-85221 A | 5/2018 |
| JP | 2018-129140 A | 8/2018 |

OTHER PUBLICATIONS

International Search Report dated May 28, 2019, issued in counterpart International Application No. PCT/JP2019/007694 (2 pages).
Notification Concerning Transmittal of International Preliminary Report on Patentability (Forms PCT/IB/326) issued in counterpart International Application No. PCT/JP2019/007694 mailed Mar. 11, 2021 with Forms PCT/IB/373, PCT/IB/338, PCT/IB/308 and PCT/ISA/237. (12 pages).
Extended (Supplementary) European Search Report dated Oct. 6, 2021, issued in counterpart EP Application No. 19853828.2. (7 pages).
Kang-Joon Park et al., "Journal of Materials Chemistry A", vol. 3, No. 44, Jan. 1, 2015 (Jan. 1, 2015), pp. 22183-22190; in Extended European Search Report dated Oct. 6, 2021. (8 pages).
Sun Ho-Hyun et al.: Chemistry of Materials, vol. 29, No. 19, 27, Sep. 2017 (2017-09-27), pp. 8486-8493; Cited in Extended European Search Report dated Oct. 6, 2021. (8 pages).

*Primary Examiner* — Cynthia K Walls
(74) *Attorney, Agent, or Firm* — WHDA, LLP

(57) ABSTRACT

A positive electrode active material for non-aqueous electrolyte secondary batteries comprises a lithium transition metal oxide containing Ni, Mn, Co, and Al and having a layered structure, wherein the content ratio of Ni in the lithium transition metal oxide is 75 to 95 mol %, the content ratio of Mn in the lithium transition metal oxide is equal to or greater than the content ratio of Co in the lithium transition metal oxide, the content ratio of Co in the lithium transition metal oxide is 0.5 to 2 mol %, the content ratio of a metal element other than Li in an Li layer in the layered structure is 1 to 2.5 mol %, and, in the lithium transition metal oxide, the half width n of a diffraction peak for (208) plane of an X-ray diffraction pattern as measured by X-ray diffraction is as follows: $0.30° \leq n \leq 0.50°$.

6 Claims, No Drawings

POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

CROSS REFERENCE TO RELATED APPLICATIONS

This application is a Continuation of U.S. patent application Ser. No. 17/269,740, filed Feb. 19, 2021, which is a National Stage Entry of International Application No. PCT/JP2019/007694 filed Feb. 27, 2019, which claims the benefit of Japanese Patent Application No. 2018-160149 filed in the Japan Patent Office on Aug. 29, 2018, each of which is incorporated by reference herein in its entirety.

TECHNICAL FIELD

The present disclosure relates to a cathode active material for a non-aqueous electrolyte secondary battery, and to a non-aqueous electrolyte secondary battery.

BACKGROUND

In recent years, as secondary batteries with high power and high energy density, non-aqueous electrolyte secondary batteries are in wide use, each of which has a cathode, an anode, and a non-aqueous electrolyte, and in which lithium ions or the like are moved between the cathode and the anode, to charge or discharge electricity.

As a cathode active material used for the cathode of the non-aqueous electrolyte secondary battery, for example, the following materials are known.

For example, Patent Document 1 discloses a cathode active material formed from a composite oxide which is represented by a composition formula $Li_aNi_bCo_cMn_dO_2$ (wherein $0.1 \leq a \leq 1.2$, $0.40 \leq b < 1.15$, $0 < c < 0.60$, $0 < d < 0.60$, $1.00 \leq (b+c+d) \leq 1.15$, and $0 < (c+d) \leq 0.60$), and which has a transition metal occupancy ratio e of an Li layer within a range of $0.006 \leq e \leq 0.150$.

In addition, for example, Patent Document 2 discloses a cathode active material formed from a lithium-nickel composite oxide of a hexagonal system with a layered structure and represented by $[Li]_{3a}[Ni_{1-x-y}Co_xAl_y]_{3b}[O_2]_{6c}$ (wherein a subscript of parentheses ([ ]) indicates a site, and x and y satisfy the conditions of $0 \leq x \leq 0.20$ and $0 \leq y \leq 0.15$), wherein a site occupancy ratio of metal ions other than lithium in the 3a site obtained by a Rietveld analysis of X-ray diffraction pattern is less than or equal to 3%, an average particle size of primary particles is greater than or equal to 1 μm, and a plurality of the primary particles are gathered to form a secondary particle.

CITATION LIST

Patent Literature

Patent Document 1: JP 2000-133262 A
Patent Document 2: JP 2000-30693 A

SUMMARY

Technical Problem

While a cathode active material including a lithium-transition metal oxide having a ratio of Ni with respect to a total amount of metal elements other than Li in a range of 75 mol %~95 mol % has an advantage of a high charging/discharging capacity, the cathode active material also has a problem in that thermal stability is low. When the thermal stability of the cathode is low, a self-heat-generation starting temperature of the battery becomes low, and, when the temperature of the battery is increased due to excessive charging, short-circuiting, or the like, a further chemical reaction that involves heat generation (self-heat-generation reaction) takes place in the battery with the increase in the temperature, and there is a possibility that the temperature of the battery is further increased.

An advantage of the present disclosure lies in improving thermal stability of a cathode active material including a lithium-transition metal oxide having a ratio of Ni with respect to a total amount of metal elements other than Li in a range of 75 mol %~95 mol %.

Solution to Problem

According to one aspect of the present disclosure, there is provided a cathode active material for a non-aqueous electrolyte secondary battery, including: a lithium-transition metal oxide having a layered structure and containing Ni, Mn, and, optionally, Co, wherein a ratio of Ni with respect to a total amount of metal elements other than Li in the lithium-transition metal oxide is in a range of 75 mol %~95 mol %, a ratio of Mn with respect to the total amount of the metal elements other than Li in the lithium-transition metal oxide is greater than or equal to a ratio of Co with respect to the total amount of the metal elements other than Li in the lithium-transition metal oxide, the ratio of Co with respect to the total amount of the metal elements other than Li in the lithium-transition metal oxide is in a range of 0 mol %~2 mol %, a ratio of metal elements other than Li present in an Li layer of the layered structure is in a range of 1 mol %~2.5 mol % with respect to the total amount of the metal elements other than Li in the lithium-transition metal oxide, and a half-width n of a diffraction peak of a (208) plane of an X-ray diffraction pattern obtained by X-ray diffraction in the lithium-transition metal oxide is in a range of $0.30° \leq n \leq 0.50°$.

According to another aspect of the present disclosure, there is provided a non-aqueous electrolyte secondary battery having a cathode having the cathode active material for the non-aqueous electrolyte secondary battery.

Advantageous Effects

According to one aspect of the present disclosure, it becomes possible to improve the thermal stability of a cathode active material including a lithium-transition metal oxide having a ratio of Ni with respect to a total amount of metal elements other than Li in a range of 75 mol %~95 mol %.

DESCRIPTION OF EMBODIMENTS

A cathode active material for a non-aqueous electrolyte secondary battery according to one aspect of the present disclosure includes a lithium-transition metal oxide having a layered structure and containing Ni, Mn, and, optionally, Co, wherein a ratio of Ni with respect to a total amount of metal elements other than Li in the lithium-transition metal oxide is in a range of 75 mol %~95 mol %, a ratio of Mn with respect to the total amount of the metal elements other than Li in the lithium-transition metal oxide is greater than or equal to a ratio of Co with respect to the total amount of the metal elements other than Li in the lithium-transition metal oxide, the ratio of Co with respect to the total amount of the metal elements other than Li in the lithium-transition metal oxide is in a range of 0 mol % 2 mol %, a ratio of metal elements other than Li present in an Li layer of the layered structure is in a range of 1 mol %~2.5 mol % with respect to the total amount of the metal elements other than Li in the lithium-transition metal oxide, and a half-width n of a diffraction peak of a (208) plane of an X-ray diffraction pattern obtained by X-ray diffraction in the lithium-transition metal oxide is in a range of $0.30° \leq n \leq 0.50°$.

Normally, the lithium-transition metal oxide having the ratio of Ni with respect to the total amount of metal elements other than Li in the range of 75 mol %~95 mol % has low thermal stability. This may be because structural stability is low for the lithium-transition metal oxide when the ratio of Ni is greater than or equal to 75 mol %.

However, according to one aspect of the present disclosure, it can be deduced that release of oxygen in the layered structure is suppressed by Mn contained in the lithium-transition metal oxide, and that, because metal elements other than Li are present in a predetermined amount in an Li layer of the layered structure, repulsion between O—O in the layered structure can be suppressed during a charging process, and the layered structure is thus stabilized. In addition, it can be deduced that, by setting the ratio of Ni to be less than or equal to 95%, reactivity of Ni can be suppressed, and that the advantages due to Mn as described above and the advantages due to metal elements other than Li present in the Li layer of the layered structure in the predetermined amount can be sufficiently obtained, resulting in stabilization of the layered structure. Further, it can be deduced that, by limiting the amount of Co contained in the lithium-transition metal oxide and setting a content of Mn to be greater than a content of Co, the advantages due to Mn as described above can be sufficiently obtained, and the layered structure is stabilized. A half-width of a diffraction peak of a (208) plane of an X-ray diffraction pattern obtained by X-ray diffraction is an indication of fluctuation of arrangement between the Li layer and the transition metal layer in the layered structure. When the half-width is in the predetermined range as described above, as in one aspect of the present disclosure, a suitable fluctuation may be caused in the arrangement between the Li layer and the transition metal layer of the layered structure, which may result in stabilization of the layered structure. As described, all of the above-described configurations in one aspect of the present disclosure described above contribute to stabilization of the layered structure of the lithium-transition metal oxide, and the advantage of improved thermal stability can only be obtained by combining the above-described configurations.

An example of a non-aqueous electrolyte secondary battery which uses the cathode active material for the non-aqueous electrode secondary battery according to one aspect of the present disclosure will now be described.

The non-aqueous electrolyte secondary battery according to an embodiment of the present disclosure comprises a cathode, an anode, and a non-aqueous electrolyte. A separator is desirably provided between the cathode and the anode. More specifically, the secondary battery has a structure in which a rolled-type electrode element in which the cathode and the anode are rolled with the separator therebetween, and the non-aqueous electrolyte are housed in an outer housing element. The electrode element is not limited to the rolled-type electrode element, and, alternatively, an electrode element of another form may be applied such as a layered electrode element in which the cathode and the anode are layered with the separator therebetween. Further, no particular limitation is imposed on the form of the non-aqueous electrolyte secondary battery, and a circular cylindrical type battery, a rectangular type battery, a coin type battery, a button type battery, a laminated type battery, or the like may be exemplified.

The cathode, the anode, the non-aqueous electrolyte, and the separator used in the non-aqueous electrolyte secondary battery according to an embodiment of the present disclosure will now be described in detail.

<Cathode>

The cathode is formed from, for example, a cathode electricity collecting element such as a metal foil, and a cathode active material layer formed over the cathode electricity collecting element. For the cathode electricity collecting element, there may be employed a foil of a metal which is stable within a potential range of the cathode such as aluminum, a film over whose surface the metal is placed, or the like. The cathode active material layer contains, for example, the cathode active material, a binder, a conductive member, or the like.

The cathode is obtained by, for example, applying and drying a cathode combined material slurry including the cathode active material, the binder, the conductive member, or the like over the cathode electricity collecting element, to form the cathode active material layer over the cathode electricity collecting element, and rolling the cathode active material layer.

The cathode active material includes a lithium-transition metal oxide having a layered structure and containing Ni, Mn, and, optionally, Co. A lithium-transition metal oxide having a layered structure and containing Ni, Mn, and, optionally, Co, will hereinafter be referred to as a "lithium-transition metal oxide of the present embodiment".

The layered structure of the lithium-transition metal oxide of the present embodiment may be, for example, a layered structure belonging to a spatial group R-3m, a layered structure belonging to a spatial group C2/m, or the like. Of these, from the viewpoints of higher capacity and stability of the layered structure, the layered structure belonging to the spatial group R-3m is desirable.

A ratio of Ni with respect to a total amount of metal elements other than Li in the lithium-transition metal oxide of the present embodiment is in a range of 75 mol %~95 mol % in view of higher capacity of the battery and improved thermal stability, and is desirably in a range of 85 mol %~95 mol %. When the ratio of Ni exceeds 95 mol %, the reactivity of Ni becomes high, and the stability of the layered structure is reduced, and, as a consequence, thermal stability is lowered. When the ratio of Ni is less than 75 mol %, it becomes difficult to achieve a high capacity of the battery.

A ratio of Mn with respect to the total amount of the metal elements other than Li in the lithium-transition metal oxide of the present embodiment is greater than or equal to a ratio of Co with respect to the total amount of the metal elements other than Li in the lithium-transition metal oxide of the present embodiment, from the viewpoint of improving thermal stability, and is desirably in a range of 1 mol %~10 mol %, and more desirably in a range of 2 mol %~8 mol %. When the ratio of Co is greater than the ratio of Mn, the release of oxygen in the layered structure is not suppressed, resulting in reduction of the stability of the layered structure, and consequently, reduction of the thermal stability.

The ratio of Co with respect to the total amount of the metal elements other than Li in the lithium-transition metal oxide of the present embodiment is in a range of 0 mol %~2 mol %, from the viewpoint of improving thermal stability, and is desirably in a range of 0.5~2 mol %. When the ratio of Co exceeds 2 mol %, for example, the above-described advantage due to Mn may be reduced, resulting in reduction of the stability of the layered structure, and, consequently, reduction of the thermal stability.

The lithium-transition metal oxide of the present embodiment may include metal elements other than Li, Ni, Mn, and Co, and may include, for example, at least one metal element or the like selected from Al, Fe, Mg, Si, Ti, Cr, Cu, Sn, Zr, Nb, Mo, Ta, W, Na, K, Ba, Sr, Bi, Be, Zn, Ca, and B. Of these, from the viewpoint of suppressing reduction of a charge/discharge cycle characteristic, at least one metal element selected from Al, Fe, Nb, Si, Mo, and Ti is desirable, and, further, of these elements, Al is desirable. The other metal elements may be, for example, uniformly dispersed in the layered structure of the lithium-transition metal oxide of the present embodiment, or may exist at a part of the layered structure. In addition, a part of the other metal elements included in the layered structure may precipitate on a surface of the particle of the lithium-transition metal oxide of the present embodiment during a manufacturing stage of the lithium-transition metal oxide of the present embodiment. The precipitated metal element is also a part of the metal element forming the lithium-transition metal oxide of the present embodiment.

Contents of elements of the lithium-transition metal oxide of the present embodiment can be measured by an inductively coupled plasma-atomic emission spectroscopy apparatus (ICP-AES), an electron probe microanalyzer (EPMA), an energy dispersive X-ray analyzer (EDX), or the like.

In the lithium-transition metal oxide of the present embodiment, metal elements other than Li are present in an Li layer of the layered structure. A ratio of the metal elements other than Li present in the Li layer of the layered structure is 1 mol %~2.5 mol % with respect to the total amount of the metal elements other than Li in the lithium-transition metal oxide, from the viewpoint of increasing a self-heat-generation starting temperature, and is desirably 1 mol %~2 mol %. When the ratio of the metal elements other than Li present in the Li layer of the layered structure is outside the above-described range, the stability of the layered structure is reduced, causing reduction of thermal stability. The metal elements other than Li present in the Li layer of the layered structure are primarily Ni, based on the ratios of the elements forming the lithium-transition metal oxide of the present embodiment, but may be other metal elements.

The ratio of the metal elements other than Li present in the Li layer of the layered structure can be obtained by a result of Rietveld analysis of an X-ray diffraction pattern by X-ray diffraction measurement of the lithium-transition metal oxide of the present embodiment.

The X-ray diffraction pattern is obtained by a powder X-ray diffraction method under the following conditions using a powder X-ray diffraction apparatus (manufactured by Rigaku Corporation, product name: "RINT-TTR", line source; Cu-Kα).

Measurement Range: 15 to 120°
Scanning Velocity: 4°/min.
Analysis Range: 30 to 120°
Background: B-spline
Profile Function: Divided Pseudo-Voigt Function
Constraint Condition: Li(3a)+Ni(3a)=1, Ni(3a)+Ni(3b)=y, wherein y is a ratio of Ni with respect to a total amount of metal elements other than Li in the lithium-transition metal oxide (0.75≤y≤0.95)
ICSD No.: 98-009-4814

Further, for the Rietveld analysis of the X-ray diffraction pattern, PDXL2 (manufactured by Rigaku Corporation), which is Rietveld analysis software, is used.

In the lithium-transition metal oxide of the present embodiment, a half-width n of a diffraction peak of a (208) plane of an X-ray diffraction pattern obtained by the above-described X-ray diffraction is 0.30°≤n≤0.50° from the viewpoint of improving thermal stability, and is desirably 0.30°≤n≤0.45°. When the half-width n of the diffraction peak of the (208) plane is outside the above-described range, a fluctuation of the arrangement between the Li layer and the transition metal layer of the layered structure may be too small or too large, resulting in reduction of the stability of the layered structure, and consequently, reduction of the thermal stability.

In the lithium-transition metal oxide of the present embodiment, a lattice constant a indicating a length of an a axis of a crystal structure obtained from the result of the X-ray diffraction pattern obtained by the X-ray diffraction is desirably in a range of 2.867 Å≤a≤2.877 Å, and a lattice constant c indicating a length of a c axis is desirably in a range of 14.18 Å≤c≤14.21 Å. When the lattice constant a is smaller than 2.867 Å, an interatomic distance in the crystal structure is narrower in comparison to the case in which the lattice constant is within the above-described range, resulting in an unstable structure, and, consequently, reduction of the thermal stability. When the lattice constant a is larger than 2.877 Å, the interatomic distance in the crystal structure is wide, resulting in an unstable structure, and consequently, possible reduction of the thermal stability in comparison to the case in which the lattice constant is within the above-described range. Further, when the lattice constant c is smaller than 14.18 Å, the interatomic distance in the crystal structure is narrow, resulting in an unstable structure, and possible reduction of the thermal stability in comparison to the case in which the lattice constant is within the above-described range. When the lattice constant c is larger than 14.21 Å, the interatomic distance in the crystal structure is wide, resulting in an unstable structure, and possible reduction of the thermal stability in comparison to the case in which the lattice constant is within the above-described range.

In the lithium-transition metal oxide of the present embodiment, a crystallite size s calculated by the Scherrer equation based on a half-width of a diffraction peak of a (104) plane of the X-ray diffraction pattern obtained by the above-described X-ray diffraction is desirably in a range of 400 Å≤s≤650 Å. When the crystallite size s of the lithium-transition metal oxide of the present embodiment is outside the above-described range, the stability of the layered structure may be reduced, and the reduction of the thermal stability may be caused. The Scherrer equation is expressed as follows.

$$s = K\lambda/B \cos\theta$$

In this equation, s represents the crystallite size, λ represents a wavelength of the X-ray, B represents the half-width of the diffraction peak of the (104) plane, θ represents a diffraction angle (in rad.), and K is a Scherrer constant. In the present embodiment, K is assumed to be 0.9.

The content of the lithium-transition metal oxide of the present embodiment is desirably greater than or equal to 90 weight % with respect to the total weight of the cathode active material from the viewpoint of, for example, effectively improving the thermal stability of the cathode active material, and is desirable greater than or equal to 99 weight %.

The cathode active material of the present embodiment may include, in addition to the lithium-transition metal oxide of the present embodiment, another lithium-transition metal oxide. As the other lithium-transition metal oxide, for example, a lithium-transition metal oxide may be exemplified having a Ni content of 0 mol %~less than 75 mol %.

An example method of manufacturing the lithium-transition metal oxide of the present embodiment will now be described.

A manufacturing method of the lithium-transition metal oxide of the present embodiment includes, for example, a first step in which a composite oxide including Ni, Mn, and an optional metal element is obtained, a second step in which the composite oxide obtained in the first step is mixed with an Li compound, and a third step in which the mixture is baked. Various parameters of the lithium-transition metal oxide of the present embodiment which is finally obtained, such as the ratio of metal elements other than Li present in the Li layer of the layered structure, the half-width n of the diffraction peak of the (208) plane, the lattice constant a, the lattice constant c, the crystallite size s, and the like are adjusted by controlling a mixture ratio of the materials in the second step, a baking condition in the third step, or the like.

In the first step, for example, while a solution of metal salts including Ni, Mn, and an optional metal element (such as Co, Al, or the like) is stirred, an alkali solution such as sodium hydroxide is dropped, to adjust the pH to the alkali side (for example, 8.5~14.0), so that a composite hydroxide including Ni, Mn, and the optional metal oxide is precipitated (co-precipitated). The composite hydroxide is baked, to obtain a composite oxide including Ni, Mn, and the optional metal element. A blending ratio of Ni and the optional metal element may be suitably determined so that the ratios of Ni, Mn, and the like are in the above-described ranges. No particular limitation is imposed on the baking temperature, and the baking temperature is, example, in a range of 500° C. to 600° C.

In the second step, the composite oxide obtained in the first step and the Li compound are mixed to obtain a mixture. A mixing ratio of the composite oxide obtained in the first step and the Li compound is such that a molar ratio of (metal elements other than Li):Li is in a range of 1:0.98~1:1.08, from the viewpoint of adjusting the parameters to the ranges described above. In the second step, during the mixing of the composite oxide obtained in the first step and the Li compound, another metal material may be added as necessary. The other metal materials are, for example, a metal element forming the composite oxide obtained in the first step, an oxide including metal elements other than Li, or the like.

In the third step, the mixture obtained in the second step is baked at a predetermined temperature and for a predetermined period of time, to obtain the lithium-transition metal oxide of the present embodiment. For the baking of the mixture in the third step, two-stage baking as described below is employed, for adjusting the parameters to the ranges described above. The baking condition of the first stage is, for example, baking with a temperature increasing rate in a range of 5.5° C./min to 1.5° C./min to a temperature in a range of 450° C.~650° C., with a reached temperature retention time of 0 to 5 hours. The baking condition of the second stage is, for example, baking with a temperature increasing rate in a range of 3.5° C./min to 0.1° C./min, to a temperature in a range of the baking temperature of the first stage ~800° C., with a reached temperature retention time of 1 to 10 hours. During the baking of the mixture, for example, the baking is executed in an oxygen gas flow with an oxygen concentration of greater than or equal to 60%, and a flow rate of the oxygen gas flow in a range of 0.2 mL/min~4 mL/min per 10 cm$^3$ of a baking furnace and greater than or equal to 0.3 L/min per 1 kg of the mixture, from the viewpoint of adjusting the parameters to the ranges described above.

Next, other materials included in the cathode active material layer will be described.

As the conductive member included in the cathode active material layer, for example, carbon black, acetylene black, Ketjen black, carbon powders such as graphite, or the like may be exemplified. These materials may be used as a single material, or two or more of these materials may be used in combination.

As the binder included in the cathode active material layer, for example, a fluorine-based polymer, a rubber-based polymer, or the like may be exemplified. As the fluorine-based polymer, for example, polytetrafluoroethylene (PTFE), polyvinylidene fluoride (PVdF), or modified materials of these polymers may be exemplified. As the rubber-based polymer, for example, a copolymer of ethylene-propylene-isoprene, a copolymer of ethylene-propylene-butadiene, or the like may be exemplified. These materials may be used as a single material, or two or more of these materials may be used in combination.

<Anode>

The anode comprises, for example, an anode electricity collecting element such as a metal foil, and an anode active material layer formed over the anode electricity collecting element. For the anode electricity collecting element, there may be employed a foil of a metal which is stable within a potential range of the anode such as copper, a film over whose surface layer the metal is placed, or the like. The anode active material layer includes, for example, an anode active material, a binder, a thickening agent, or the like.

The anode is obtained, for example, by applying and drying an anode combined material slurry including the anode active material, the thickening agent, and the binder over the anode electricity collecting element, to form the anode active material layer over the anode electricity collecting element, and rolling the anode active material layer.

No particular limitation is imposed on the anode active material included in the anode active material layer so long as the material can occlude and release lithium ions. For example, there may be employed a carbon material, a metal which can form an alloy with lithium or an alloy compound including such a metal, or the like. As the carbon material, graphites such as natural graphite, non-graphitizable carbon, and artificial graphite, cokes, or the like may be employed. As the alloy compound, a material which includes at least one metal which can form an alloy with lithium may be employed. As the element which can form an alloy with lithium, silicon, or tin may be desirably employed, or a material in which these elements are bonded with oxygen such as silicon oxide and tin oxide may be employed. Further, a mixture of the above-described carbon material and the compounds of silicon or tin may be employed. In addition to the above, a material having a higher potential of charging/discharging with respect to metal lithium than the carbon material or the like may be used, such as lithium titanate.

As the binder included in the anode active material layer, for example, fluorine-based polymer or rubber-based polymer may be employed, similar to the case of the cathode, or a styrene-butadiene copolymer (SBR) or a modified material of the copolymer may be employed. As the binder included in the anode active material layer, a fluorine-based resin, PAN, a polyimide-based resin, an acrylic resin, a polyolefin-based resin, or the like may be employed, similar to the case of the cathode. When the anode combined material slurry is prepared using a water-based solvent, there is desirably employed styrene-butadiene rubber (SBR), CMC or a salt thereof, a polyacrylic acid (PAA) or a salt thereof (such as PAA-Na, PAA-K, or the like; alternatively, a partial neutral salt may be employed), polyvinyl alcohol (PVA), or the like.

As the thickening agent included in the anode active material layer, for example, carboxymethyl cellulose (CMC), polyethylene oxide (PEO), or the like may be employed. These materials may be used as a single material, or two or more materials may be used in combination.

<Non-Aqueous Electrolyte>

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution), and may alternatively be a solid electrolyte using a gel-form polymer or the like. For the non-aqueous solvent, for example, esters, ethers, nitriles such as acetonitrile, amides such as dimethylformamide, or a mixture solvent of two or more of these solvents may be employed. The non-aqueous solvent may include a halogen substitution product in which hydrogen of the solvent described above is at least partially substituted with a halogen atom such as fluorine.

Examples of the esters include cyclic carbonic acid esters such as ethylene carbonate (EC), propylene carbonate (PC), and butylene carbonate; chain carbonic acid esters such as dimethyl carbonate (DMC), ethylmethyl carbonate (EMC), diethyl carbonate (DEC), methylpropyl carbonate, ethylpropyl carbonate, and methylisopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl furan, 1,8-cineol, and crown ether, and chain ethers such as 1,2-dimethoxy ethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxy ethane, 1,2-dibutoxy ethane, diethylene glycol dimethyl ether, diethylene glycol diethyl ether, diethylene glycol dibutyl ether, 1,1-dimethoxy methane, 1,1-diethoxy ethane, triethylene glycol dimethyl ether, and tetraethylene glycol dimethyl ether.

As the halogen substitution product, desirably, fluorinated cyclic carbonic acid esters such as fluoroethylene carbonate (FEC), fluorinated chain carbonic acid ester, and fluorinated chain carboxylate esters such as fluoromethyl propionate (FMP) are employed.

The electrolyte salt is desirably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiOF_{6-x}(C_nF_{2n+1})_x$ (wherein 1<x<6, n is 1 or 2), $LiB_{10}Cl_{10}$, LiCl, LiBr, LiI, lithium chloroborane, lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (wherein l and m is an integer greater than or equal to 0). As the lithium salt, these materials may be used as a single material, or a mixture of a plurality of these materials may be used. Of these, $LiPF_6$ is desirably used, from the viewpoint of electrochemical stability or the like. A concentration of the lithium salt is desirably set to 0.8~1.8 mol per 1 L of the non-aqueous solvent.

<Separator>

For the separator, for example, a porous sheet having ion permeability and an electrical insulating characteristic is employed. Specific examples of the porous sheet include a microporous thin film, a woven fabric, and a non-woven fabric. As a material of the separator, olefin-based resins such as polyethylene and polypropylene, and cellulose are desirable. The separator may be a layered element having a cellulose fiber layer and a thermoplastic resin fiber layer such as an olefin-based resin. Alternatively, a structure in which an aramid resin or the like is applied on a surface of the separator may be used. On an interface between the separator and at least one of the cathode and the anode, a filler layer including an inorganic filler may be formed. As the inorganic filler, for example, oxides including at least one of titanium (Ti), aluminum (Al), silicon (Si), and magnesium (Mg), and phosphates or phosphates having a surface treated with hydroxide or the like may be employed. The filler layer can be formed by, for example, applying a slurry containing the filler over a surface of the cathode, the anode, or the separator.

EXAMPLES

The present disclosure will now be described further with Examples. The present disclosure is not limited to these Examples.

Referential Example A

[Manufacturing of Cathode Active Material]

A composite oxide containing Ni, Mn, Co, and Al ($Ni_{0.90}Mn_{0.04}Co_{0.02}Al_{0.04}O_2$) and LiOH were mixed with a molar ratio of a total amount of Ni, Mn, Co, and Al to Li of 1:1.03. Under an oxygen gas flow with a flow rate of 2 mL/min per 10 cm³ and 5 L/min per 1 kg of the transition metal oxide, and an oxygen concentration of 95%, the mixture was baked with a temperature increasing rate of 3.5° C./min up to 650° C., and then was baked with a temperature increasing rate of 0.5° C./min from 650° C. to 730° C. The baked product was water-washed, and a lithium-transition metal oxide was obtained. Ratios of Ni, Mn, Co, and Al in the obtained lithium-transition metal oxide were measured. The ratio of Ni was 90 mol %, the ratio of Mn was 4 mol %, the ratio of Co was 2 mol %, and the ratio of Al was 4 mol %.

Powder X-ray diffraction measurement was performed on the lithium-transition metal oxide of Referential Example A under conditions already described, to obtain an X-ray diffraction pattern. As a result, a diffraction line indicating a layered structure was confirmed. The ratio of metal elements other than Li present in the Li layer was 1.7 mol %, the half-width of the diffraction peak of the (208) plane was 0.43°, the lattice constant a was 2.873 Å, the lattice constant c was 14.20 Å, and the crystallite size s was 548 Å. This substance was set as the cathode active material of Referential Example A.

Comparative Example 1-1

A lithium-transition metal oxide was manufactured in a manner similar to that of Referential Example A except that a composite oxide containing Ni, Mn, Co, and Al ($Ni_{0.93}Co_{0.02}Al_{0.05}O_2$), $Ti(OH)_4$, and LiOH were mixed with a molar ratio of a total amount of Ni, Mn, Co, Al, and Ti to Li of 1:1.05, and that the flow rate was set to 0.1 mL/min per 10 cm$^3$ and 0.25 L/min per 1 kg of the transition metal oxide. Ratios of Ni, Co, Al, and Ti in the obtained lithium-transition metal oxide were measured. The ratio of Ni was 90 mol %, the ratio of Co was 2 mol %, the ratio of Al was 5 mol %, and the ratio of Ti was 3 mol %.

Further, as a result of the powder X-ray diffraction measurement of the lithium-transition metal oxide of Comparative Example 1 similar to Referential Example A, a diffraction line indicating the layered structure was confirmed. The ratio of metal elements other than Li present in the Li layer was 1.4 mol %, and the half-width of the diffraction peak of the (208) plane was 0.37°. This substance was set as the cathode active material of Comparative Example 1-1.

Comparative Example 1-2

A lithium-transition metal oxide was manufactured in a manner similar to Referential Example A except that the materials were mixed with a molar ratio of the total amount of Ni, Mn, Co, and Al to Li of 1:0.97. Ratios of Ni, Mn, Co, and Al in the obtained lithium-transition metal oxide were measured. The ratio of Ni was 90 mol %, the ratio of Mn was 4 mol %, the ratio of Co was 2 mol %, and the ratio of Al was 4 mol %.

As a result of the powder X-ray diffraction measurement of the lithium-transition metal oxide of Comparative Example 1-2 similar to Referential Example A, a diffraction line indicating the layered structure was confirmed. The ratio of the metal elements other than Li present in the Li layer was 3 mol %, and the half-width of the diffraction peak of the (208) plane was 0.48°. This substance was set as the cathode active material of Comparative Example 1-2.

Comparative Example 1-3

A lithium-transition metal oxide was manufactured in a manner similar to Referential Example A except that the materials were mixed with a molar ratio of the total amount of Ni, Mn, Co, and Al to Li of 1:1.1. The ratios of Ni, Mn, Co, and Al in the obtained lithium-transition metal oxide were measured. The ratio of Ni was 90 mol %, the ratio of Mn was 4 mol %, the ratio of Co was 2 mol %, and the ratio of Al was 4 mol %.

As a result of the powder X-ray diffraction measurement of the lithium-transition metal oxide of Comparative Example 1-3 similar to Referential Example A, a diffraction line indicating the layered structure was confirmed. The ratio of the metal elements other than Li present in the Li layer was 0.5 mol %, and the half-width of the diffraction peak of the (208) plane was 0.31°. This substance was set as the cathode active material of Comparative Example 1-3.

Comparative Example 1-4

A lithium-transition metal oxide was manufactured in a manner similar to Referential Example A except that a composite oxide containing Ni, Mn, Co, and Al ($Ni_{0.92}Co_{0.02}Al_{0.05}O_2$), $Nb_2O_5$, and LiOH were mixed with a molar ratio of a total amount of Ni, Mn, Co, Al, and Nb to Li of 1:1.1, and that the mixture was baked with a temperature increasing rate of 1° C./min to 650° C. and then was baked with a temperature increasing rate of 0.05° C./min from 650° C. to 730° C. Ratios of Ni, Mn, Co, Al, and Nb in the obtained lithium-transition metal oxide were measured. The ratio of Ni was 90 mol %, the ratio of Mn was 4 mol %, the ratio of Co was 2 mol %, the ratio of Al was 2 mol %, and the ratio of Nb was 2 mol %.

As a result of the powder X-ray diffraction measurement of the lithium-transition metal oxide of Comparative Example 1-4 similar to Referential Example A, a diffraction line indicating the layered structure was confirmed. The ratio of the metal elements other than Li present in the Li layer was 3 mol %, and the half-width of the diffraction peak of the (208) plane was 0.23°. This substance was set as the cathode active material of Comparative Example 1-4.

Comparative Example 1-5

A lithium-transition metal oxide was manufactured in a manner similar to Referential Example A except that the molar ratio of the total amount of Ni, Mn, Co, and Al to Li was changed to 1:1.1, and that the highest reaching temperature of the baking process was changed to 680° C. Ratios of Ni, Mn, Co, and Al in the obtained lithium-transition metal oxide were measured. The ratio of Ni was 90 mol %, the ratio of Mn was 4 mol %, the ratio of Co was 2 mol %, and the ratio of Al was 4 mol %.

As a result of the powder X-ray diffraction measurement on the lithium-transition metal oxide of Comparative Example 1-5 similar to Referential Example A, a diffraction line indicating the layered structure was confirmed. The ratio of the metal elements other than Li present in the Li layer was 0.5 mol %, and the half-width of the diffraction peak of the (208) plane was 0.64°. This substance was set as the cathode active material of Comparative Example 1-5.

[Manufacturing of Cathode]

Ninety-five (95) weight % of the cathode active material of Referential Example A, 3 weight % of acetylene black serving as a conductive member, and 2 weight % of polyvinylidene fluoride serving as a binder were mixed. The mixture was kneaded with a kneader (T. K. HIVIS MIX, manufactured by Primix Corporation), to prepare a cathode combined material slurry. The cathode combined material slurry was applied on an aluminum foil of a thickness of 15 μm, and the applied film was dried to form the cathode active material layer over the aluminum foil. This structure is set as a cathode of Referential Example A. Cathodes were similarly manufactured for Comparative Examples 1-1~1-5.

[Preparation of Non-Aqueous Electrolyte]

Ethylene carbonate (EC), methyl ethyl carbonate (MEC), and dimethyl carbonate (DMC) were mixed with a volume ratio of 3:3:4. Into this mixture solvent, lithium hexafluorophosphate ($LiPF_6$) was dissolved at a concentration of 1.2 mol/liter, to prepare a non-aqueous electrolyte.

[Manufacturing of Test Cell]

The cathode of Referential Example A and an anode having graphite as the anode active material were layered in an opposing manner with a separator therebetween, and the layered structure was rolled, to manufacture an electrode element. Then, the electrode element and the non-aqueous electrolyte described above were inserted into an outer housing element made of aluminum, to manufacture a test cell. Test cells were similarly manufactured for Comparative Examples 1-1~1-5.

[Runaway Reaction Measurement Test]

A self-heat-generation starting temperature of a battery was measured using a runaway reaction measurement apparatus (Accelerated rate calorimeter: ARC, manufactured by Thermal Hazard Technology) under the following conditions.

Measurement start temperature: 100° C.
Retention temperature: 20 min
Heat generation detecting temperature: 0.02° C./min
Temperature increasing width: 5° C.
Battery voltage: 4.2V, charged state When no temperature increase of greater than or equal to the heat generation detecting temperature was detected for 20 minutes from the measurement start temperature, the temperature was increased to a next step, and the measurement was again performed. When a temperature increase of greater than or equal to the heat generation detecting temperature was detected, it was judged that the self heat generation had started, and the temperature at this point was set as the self-heat-generation starting temperature.

TABLE 1 summarizes results of the self-heat-generation starting temperatures of the batteries of Referential Example A and Comparative Examples 1-1~1-5. In TABLE 1, with the self-heat-generation starting temperature of Comparative Example 1-1 as a reference, a difference of the self-heat-generation starting temperature from this temperature was determined for Referential Example A and for the other Comparative Examples, which is shown as a change amount of the self-heat-generation starting temperature. A positive difference indicates that the self-heat generation starting temperature was increased, thus showing that the thermal stability of the cathode active material was improved.

transition metal oxide were measured. The ratio of Ni was 94 mol %, the ratio of Mn was 4 mol %, and the ratio of Co was 2 mol %.

As a result of the powder X-ray diffraction measurement of the lithium-transition metal oxide of Referential Example B similar to Referential Example A, a diffraction line indicating the layered structure was confirmed. The ratio of the metal elements other than Li present in the Li layer was 2.1 mol %, the half-width of the diffraction peak of the (208) plane was 0.44°, the lattice constant a was 2.875 Å, the lattice constant c was 14.21 Å, and the crystallite size s was 607 Å. This substance was set as the cathode active material of Referential Example B.

Comparative Example 2-1

A lithium-transition metal oxide was manufactured in a manner similar to Referential Example B except that the composite oxide containing Ni, Mn, and Co was changed to a composite oxide containing Ni, Mn, Co, and Al ($Ni_{0.94}Mn_{0.02}Co_{0.03}Al_{0.01}O_2$). Ratios of Ni, Mn, Co, and Al in the obtained lithium-transition metal oxide were measured. The ratio of Ni was 94 mol %, the ratio of Mn was 2 mol %, the ratio of Co was 3 mol %, and the ratio of Al was 1 mol %.

TABLE 1

| | Lithium-transition metal oxide | | | | | Change amount of self-heat-generation starting temperature (° C.) |
|---|---|---|---|---|---|---|
| | Ni (mol %) | Mn (mol %) | Co (mol %) | Other metal elements (mol %) | Metal elements other than Li present in Li layer (mol %) | (208) Half-width (°) |
| Referential Example A | 90 | 4 | 2 | Al (4) | 1.7 | 0.43 | +6.3 |
| Comparative Example 1-1 | 90 | 0 | 2 | Al (5), Ti (3) | 1.4 | 0.37 | 0 |
| Comparative Example 1-2 | 90 | 4 | 2 | Al (4) | 3 | 0.48 | 0 |
| Comparative Example 1-3 | 90 | 4 | 2 | Al (4) | 0.5 | 0.31 | −0.4 |
| Comparative Example 1-4 | 90 | 4 | 2 | Al (2), Nb (2) | 3 | 0.23 | −0.2 |
| Comparative Example 1-5 | 90 | 4 | 2 | Al (4) | 0.5 | 0.64 | −0.9 |

As can be understood from TABLE 1, the self-heat-generation starting temperature was increased, and the thermal stability of the cathode active material was improved only for Referential Example A.

Referential Example B

A composite oxide containing Ni, Mn, and Co ($Ni_{0.94}Mn_{0.04}Co_{0.02}O_2$) and LiOH were mixed with a molar ratio of a total amount of Ni, Mn, and Co to Li of 1:1.03. Under an oxygen gas flow with a flow rate of 4 mL/min per 10 cm³ and 10 L/min per 1 kg of the transition metal oxide, and an oxygen concentration of 95%, the mixture was baked with a temperature increasing rate of 3.5° C./min to 650° C., and was then baked with a temperature increasing rate of 0.5° C./min from 650° C. to 700° C. The baked product was water-washed, and a lithium-transition metal oxide was obtained. Ratios of Ni, Mn, and Co in the obtained lithium- As a result of the powder X-ray diffraction measurement on the lithium-transition metal oxide of Comparative Example 2-1 similar to Referential Example A, a diffraction line indicating the layered structure was confirmed. The ratio of the metal elements other than Li present in the Li layer was 1.4 mol %, and the half-width of the diffraction peak of the (208) plane was 0.32°. This substance was set as the cathode active material of Comparative Example 2-1.

Comparative Example 2-2

A lithium-transition metal oxide was manufactured in a manner similar to Referential Example B except that the composite oxide containing Ni, Mn, and Co was changed to a composite oxide containing Ni, Mn, and Co ($Ni_{0.94}Mn_{0.03}Co_{0.03}O_2$). Ratios of Ni, Mn, and Co in the obtained lithium-transition metal oxide were measured. The ratio of Ni was 94 mol %, the ratio of Mn was 3 mol %, and the ratio of Co was 3 mol %.

As a result of the powder X-ray diffraction measurement of the lithium-transition metal oxide of Comparative Example 2-2 similar to Referential Example A, a diffraction line indicating the layered structure was confirmed. The ratio of the metal elements other than Li present in the Li layer was 1.9 mol %, and the half-width of the diffraction peak of the (208) plane was 0.49°. This substance was set as the cathode active material of Comparative Example 2-2.

Comparative Example 2-3

A lithium-transition metal oxide was manufactured in a manner similar to Referential Example B, except that the composite oxide containing Ni, Mn, and Co was changed to a composite oxide containing Ni, Mn, Co, and Al ($Ni_{0.94}Mn_{0.01}Co_{0.02}Al_{0.03}O_2$). Ratios of Ni, Mn, Co, and Al in the obtained lithium-transition metal oxide were measured. The ratio of Ni was 94 mol %, the ratio of Mn was 1 mol %, the ratio of Co was 2 mol %, and the ratio of Al was 3 mol %.

As a result of the powder X-ray diffraction measurement of the lithium-transition metal oxide of Comparative Example 2-3 similar to Referential Example A, a diffraction line indicating the layered structure was confirmed. The ratio of the metal elements other than Li present in the Li layer was 1.6 mol %, and the half-width of the diffraction peak of the (208) plane was 0.32°. This substance was set as the cathode active material of Comparative Example 2-3.

Comparative Example 2-4

A lithium-transition metal oxide was manufactured in a manner similar to Referential Example B, except that the composite oxide containing Ni, Mn, and Co was changed to a composite oxide containing Ni, Co, and Al ($Ni_{0.94}Co_{0.015}Al_{0.045}O_2$). Ratios of Ni, Co, and Al in the obtained lithium-transition metal oxide were measured. The ratio of Ni was 94 mol %, the ratio of Co was 1.5 mol %, and the ratio of Al was 4.5 mol %.

As a result of the powder X-ray diffraction measurement of the lithium-transition metal oxide of Comparative Example 2-4 similar to Referential Example A, a diffraction line indicating the layered structure was confirmed. The ratio of the metal elements other than Li present in the Li layer was 1.1 mol %, and the half-width of the diffraction peak of the (208) plane was 0.4°. This substance was set as the cathode active material of Comparative Example 2-4.

Test cells were manufactured in a manner similar to Referential Example A, using the cathode active materials of Referential Example B, and Comparative Examples 2-1~2-4, and the self-heat-generation starting temperature of the battery was measured under the conditions similar to those described above.

TABLE 2 summarizes results of the self-heat-generation starting temperatures of Referential Example B and Comparative Examples 2-1~2-4. In TABLE 2, with the self-heat-generation starting temperature of Comparative Example 2-4 as a reference, a difference of the self-heat-generation starting temperatures of Referential Example B and the other Comparative Examples from the reference temperature was determined, which is shown as a change amount of the self-heat-generation starting temperature. A difference of a positive value indicates that the self-heat-generation starting temperature was increased, and, consequently, the thermal stability of the cathode active material was improved.

TABLE 2

| | Lithium-transition metal oxide | | | | | | Change |
|---|---|---|---|---|---|---|---|
| | Ni (mol %) | Mn (mol %) | Co (mol %) | Other metal elements (mol %) | Metal elements other than Li present in Li layer (mol %) | (208) Half-width (°) | amount of self-heat-generation starting temperature (° C.) |
| Referential Example B | 94 | 4 | 2 | — | 2.1 | 0.44 | +5 |
| Comparative Example 2-1 | 94 | 2 | 3 | Al (1) | 1.4 | 0.32 | 0 |
| Comparative Example 2-2 | 94 | 3 | 3 | — | 1.9 | 0.49 | 0 |
| Comparative Example 2-3 | 94 | 1 | 2 | Al (3) | 1.6 | 0.32 | −0.2 |
| Comparative Example 2-4 | 94 | — | 1.5 | Al (4.5) | 1.1 | 0.4 | 0 |

As can be understood from TABLE 2, the self-heat-generation starting temperature was increased and the thermal stability of the cathode active material was improved only for Referential Example B.

Referential Example 3-1

A composite oxide containing Ni, Mn, Co, and Al ($Ni_{0.77}Mn_{0.16}Co_{0.02}Al_{0.05}O_2$), $Ti(OH)_4$, and LiOH were mixed with a molar ratio of a total amount of Ni, Mn, Co, Al, and Ti to Li of 1:1.05. Under an oxygen gas flow with a flow rate of 2 mL/min per 10 cm³ and 5 L/min per 1 kg of the transition metal oxide, and an oxygen concentration of 95%, the mixture was baked with a temperature increasing rate of 3.5° C./min to 650° C., and was then baked with a temperature increasing rate of 0.5° C./min from 650° C. to 780° C. The baked product was water-washed, and a lithium-transition metal oxide was obtained. Ratios of Ni, Mn, and Co in the obtained lithium-transition metal oxide were measured. The ratio of Ni was 73 mol %, the ratio of Mn was 15 mol %, the ratio of Co was 2 mol %, the ratio of Al was 5 mol, and the ratio of Ti was 5 mol %.

As a result of the powder X-ray diffraction measurement of the lithium-transition metal oxide of Referential Example 3-1 similar to Referential Example A, a diffraction line indicating the layered structure was confirmed. The ratio of the metal elements other than Li present in the Li layer was 2.4 mol %, and the half-width of the diffraction peak of the (208) plane was 0.46°. This substance was set as the cathode active material of Referential Example 3-1. A test cell was manufactured in a manner similar to Referential Example A using the cathode active material of Referential Example 3-1, and the self-heat-generation starting temperature of the battery was measured under conditions similar to those described above. In addition, a test cell was manufactured using, as the cathode active material, a lithium-transition metal oxide which does not contain Mn, and which contains Ni in a ratio of 73 mol %, Co in a ratio of 15 mol %, Al in a ratio of 7 mol %, and Ti in a ratio of 5 mol %. The self-heat-generation starting temperature (reference value) was measured under conditions similar to those described above, and a change amount of the self-heat-generation starting temperature of Referential Example 3-1 was determined. The results are shown in TABLE 3.

Example 3-2

A lithium-transition metal oxide was manufactured in a manner similar to Referential Example 3-1 except that a composite oxide containing Ni, Mn, Co, and Al ($Ni_{0.82}Mn_{0.11}Co_{0.02}Al_{0.05}O_2$), $Fe_2O_3$, and LiOH were mixed with a molar ratio of a total amount of Ni, Mn, Co, Al, and Fe to Li of 1:1.05. Ratios of Ni, Mn, Co, Al, and Fe in the obtained lithium-transition metal oxide were measured. The ratio of Ni was 77 mol %, the ratio of Mn was 10 mol %, the ratio of Co was 2 mol %, the ratio of Al was 5 mol %, and the ratio of Fe was 6 mol %.

As a result of the powder X-ray diffraction measurement on the lithium-transition metal oxide of Example 3-2 similar to Referential Example A, a diffraction line indicating the layered structure was confirmed. The ratio of the metal elements other than Li present in the Li layer was 2.5 mol %, and the half-width of the diffraction peak of the (208) plane was 0.49°. This substance was set as the cathode active material of Example 3-2. A test cell was manufactured using the cathode active material of Example 3-2 in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 77 mol %, Co in a ratio of 10 mol %, Al in a ratio of 7 mol %, and Fe in a ratio of 6 mol %. The self-heat-generation starting temperature (reference value) was measured under conditions similar to those described above, and a change amount of self-heat-generation starting temperature of Example 3-2 was determined. The results are shown in TABLE 3.

Example 3-3

A lithium-transition metal oxide was manufactured in a manner similar to Referential Example 3-1 except that a composite oxide containing Ni, Mn, Co, and Al ($Ni_{0.88}Mn_{0.05}Co_{0.02}Al_{0.05}O_2$), $Fe_2O_3$, and LiOH were mixed with a molar ratio of a total amount of Ni, Mn, Co, Al, and Fe to Li of 1:1.05, and that the highest reaching temperature of the baking process was changed to 750° C. Ratios of Ni, Mn, Co, Al, and Fe in the obtained lithium-transition metal oxide were measured. The ratio of Ni was 85 mol %, the ratio of Mn was 5 mol %, the ratio of Co was 2 mol %, the ratio of Al was 5 mol %, and the ratio of Fe was 3 mol %.

As a result of the powder X-ray diffraction measurement of the lithium-transition metal oxide of Example 3-3 similar to Referential Example A, a diffraction line indicating the layered structure was confirmed. The ratio of the metal elements other than Li present in the Li layer was 1.7 mol %, the half-width of the diffraction peak of the (208) plane was 0.45°, the lattice constant a was 2.870 Å, the lattice constant c was 14.19 Å, and the crystallite size s was 454 Å. This substance was set as the cathode active material of Example 3-3. A test cell was manufactured using the cathode active material of Example 3-3 in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 85 mol %, Co in a ratio of 12 mol %, and Al in a ratio of 3 mol %, and having the ratio of the metal elements other than Li present in the Li layer of 1.0 mol % and the half-width of the diffraction peak of the (208) plane of 0.41°. The self-heat-generation starting temperature (reference value) was measured under conditions similar to those described above, and a change amount of the self-heat-generation starting temperature of Example 3-3 was determined. The results are shown in TABLE 3.

Example 3-4

A lithium-transition metal oxide was manufactured in a manner similar to Referential Example 3-1 except that a composite oxide containing Ni, Mn, Co, and Al ($Ni_{0.89}Mn_{0.06}Co_{0.02}Al_{0.03}O_2$), $Nb_2O_5$, and LiOH were mixed with a molar ratio of a total amount of Ni, Mn, Co, Al, and Nb to Li of 1:1.05, and that the highest reaching temperature of the baking process was changed to 750° C. Ratios of Ni, Mn, Co, Al, and Nb in the obtained lithium-transition metal oxide were measured. The ratio of Ni was 88.5 mol %, the ratio of Mn was 6 mol %, the ratio of Co was 2 mol %, the ratio of Al was 3 mol %, and the ratio of Nb was 0.5 mol %.

As a result of the powder X-ray diffraction measurement on the lithium-transition metal oxide of Example 3-4 similar to Referential Example A, a diffraction line indicating the layered structure was confirmed. The ratio of the metal elements other than Li present in the Li layer was 2.1 mol %, the half-width of the diffraction peak of the (208) plane was 0.39°, the lattice constant a was 2.873 Å, the lattice constant c was 14.21 Å, and the crystallite size s was 521 Å. This substance was set as the cathode active material of Example 3-4. A test cell was manufactured using the cathode active material of Example 3-4 in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 88.5 mol %, Co in a ratio of 8 mol %, Al in an amount of 3 mol %, and Nb in a ratio of 0.5 mol %. The self-heat-generation starting temperature (reference value) was measured under conditions similar to those described above, and a change amount of the self-heat-generation starting temperature of Example 3-4 was determined. The results are shown in TABLE 3.

Referential Example C

A lithium-transition metal oxide was manufactured in a manner similar to Referential Example 3-1 except that a composite oxide containing Ni, Mn, Co, and Al ($Ni_{0.9}Mn_{0.04}Co_{0.02}Al_{0.04}O_2$) and LiOH were mixed with a molar ratio of a total amount of Ni, Mn, Co, and Al to Li of 1:1.03, and that the highest reaching temperature of the baking process was changed to 730° C. Ratios of Ni, Mn, Co, and Al in the obtained lithium-transition metal oxide were measured. The ratio of Ni was 90 mol %, the ratio of Mn was 4 mol %, the ratio of Co was 2 mol %, and the ratio of Al was 4 mol %.

As a result of the powder X-ray diffraction measurement on the lithium-transition metal oxide of Referential Example C similar to Referential Example A, a diffraction line indicating the layered structure was confirmed. The ratio of the metal elements other than Li present in the Li layer was 1.7 mol %, the half-width of the diffraction peak of the (208) plane was 0.43°, the lattice constant a was 2.873 Å, the lattice constant c was 14.20 Å, and the crystallite size s was 548 Å. This substance was set as the cathode active material of Referential Example C. A test cell was manufactured using the cathode active material of Referential Example C in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 90 mol %, Co in a ratio of 6 mol %, and Al in a ratio of 4 mol %, and having the ratio of the metal elements other than Li present in the Li layer of 1.2 mol % and the half-width of the diffraction peak of the (208) plane of 0.42°. The self-heat-generation starting temperature (reference value) was measured under conditions similar to those described above, and a change amount of the self-heat-generation starting temperature of Referential Example C was determined. The results are shown in TABLE 3.

Example 3-6

A lithium-transition metal oxide was manufactured in a manner similar to Referential Example 3-1 except that a composite oxide containing Ni, Mn, Co, and Al ($Ni_{0.92}Mn_{0.015}Co_{0.015}Al_{0.04}O_2$), SiO, $Fe_2O_3$, and LiOH were mixed with a molar ratio of a total amount of Ni, Mn, Co, Al, Si, and Fe to Li of 1:1.05, and that the highest reaching temperature of the baking process was changed to 700° C. Ratios of Ni, Mn, Co, Al, Si, and Fe in the obtained lithium-transition metal oxide were measured. The ratio of Ni was 90.5 mol %, the ratio of Mn was 1.5 mol %, the ratio of Co was 1.5 mol %, the ratio of Al was 5 mol %, the ratio of Si was 0.5 mol %, and the ratio of Fe was 1 mol %.

As a result of the powder X-ray diffraction measurement of the lithium-transition metal oxide of Example 3-6 similar to Referential Example A, a diffraction line indicating the layered structure was confirmed. The ratio of the metal elements other than Li present in the Li layer was 1.4 mol %, the half-width of the diffraction peak of the (208) plane was 0.33°, the lattice constant a was 2.873 Å, the lattice constant c was 14.20 Å, and the crystallite size s was 587 Å. This substance was set as the cathode active material of Example 3-6. A test cell was manufactured using the cathode active material of Example 3-6 in a manner similar to Referential Example A, and the self-heat-generation starting temperature was measured under conditions similar to those described above. In addition, a test cell was manufactured using, as the cathode active material, a lithium-transition metal oxide which does not contain Mn and which contains Ni in a ratio of 90.5 mol %, Co in a ratio of 4.5 mol %, and Al in a ratio of 5 mol %. The self-heat-generation starting temperature (reference value) was measured under conditions similar to those described above, and a change amount of the self-heat-generation starting temperature of Example 3-6 was determined. The results are shown in TABLE 3.

Referential Example D

A lithium-transition metal oxide was manufactured in a manner similar to Referential Example 3-1 except that a composite oxide containing Ni, Mn, and Co ($Ni_{0.94}Mn_{0.04}Co_{0.02}O_2$) and LiOH were mixed with a molar ratio of a total amount of Ni, Mn, and Co to Li of 1:1.03, that the oxygen flow rate was changed to 4 mL/min per 10 $cm^3$ and 10 L/min per 1 kg of the transition metal oxide, and that the highest reaching temperature of the baking process was changed to 700° C. Ratios of Ni, Mn, and Co in the obtained lithium-transition metal oxide were measured. The ratio of Ni was 94 mol %, the ratio of Mn was 4 mol %, and the ratio of Co was 2 mol %.

As a result of the powder X-ray diffraction measurement of the lithium-transition metal oxide of Referential Example D similar to Referential Example A, a diffraction line indicating the layered structure was confirmed. The ratio of the metal elements other than Li present in the Li layer was 2.1 mol %, the half-width of the diffraction peak of the (208) plane was 0.44°, the lattice constant a was 2.875 Å, the lattice constant c was 14.21 Å, and the crystallite size s was 607 Å. This substance was set as the cathode active material of Referential Example D. A test cell was manufactured using the cathode active material of Referential Example D in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 94 mol %, Co in a ratio of 1.5 mol %, and Al in a ratio of 4.5 mol %, and having the ratio of the metal elements other than Li present in the Li layer of 1.7 mol %, and the half-width of the diffraction peak of the (208) plane of 0.47°. The self-heat-generation starting temperature (reference value) was measured under conditions similar to those described above, and a change amount of the self-heat-generation stating temperature of Referential Example D was determined. The results are shown in TABLE 3.

Referential Example 3-8

A lithium-transition metal oxide was manufactured in a manner similar to Referential Example 3-1 except that a composite oxide containing Ni, Mn, Co, and Al ($Ni_{0.955}Mn_{0.02}Co_{0.02}Al_{0.05}O_2$) and LiOH were mixed with a molar ratio of a total amount of Ni, Mn, Co, and Al to Li of 1:1.05, and that the highest reaching temperature of the baking process was changed to 700° C. Ratios of Ni, Mn, Co, and Al in the obtained lithium-transition metal oxide were measured. The ratio of Ni was 95.5 mol %, the ratio of Mn was 2 mol %, the ratio of Co was 2 mol %, and the ratio of Al was 0.5 mol %.

As a result of the powder X-ray diffraction measurement on the lithium-transition metal oxide of Example 3-8 similar to Referential Example A, a diffraction line indicating the layered structure was confirmed. The ratio of the metal elements other than Li present in the Li layer was 2.1 mol %, the half-width of the diffraction peak of the (208) plane was 0.42°, the lattice constant a was 2.875 Å, the lattice constant c was 14.21 Å, and the crystallite size s was 425 Å. This substance was set as the cathode active material of Referential Example 3-7. A test cell was manufactured using the cathode active material of Referential Example 3-7 in a manner similar to Referential Example A, and the self-heat-generation starting temperature was measured under conditions similar to those described above. In addition, a test cell was manufactured using, as the cathode active material, a lithium-transition metal oxide which does not contain Mn, and which contains Ni in a ratio of 95.5%, and Al in a ratio of 4.5 mol %. The self-heat-generation starting temperature (reference value) was measured under conditions similar to those described above, and a change amount of the self-heat-generation starting temperature of Referential Example 3-8 was determined. The results are shown in TABLE 3.

TABLE 3

|  | Lithium-transition metal oxide | | | | | | Change amount of self-heat-generation starting temperature (° C.) |
| --- | --- | --- | --- | --- | --- | --- | --- |
|  | Ni (mol %) | Mn (mol %) | Co (mol %) | Other metal elements (mol %) | Metal elements other than Li present in Li layer (mol %) | (208) Half-width (°) |  |
| Referential Example 3-1 | 73 | 15 | 2 | Al (5), Ti (5) | 2.4 | 0.46 | 0 |
| Example 3-2 | 77 | 10 | 2 | Al (5), Fe (6) | 2.5 | 0.49 | +1.4 |
| Example 3-3 | 85 | 5 | 2 | Al (5), Fe (3) | 1.7 | 0.45 | +4.2 |
| Example 3-4 | 88.5 | 6 | 2 | Al (3), Nb (0.5) | 2.1 | 0.39 | +9.6 |
| Referential Example C | 90 | 4 | 2 | Al (4) | 1.7 | 0.43 | +6.3 |
| Example 3-6 | 90.5 | 1.5 | 1.5 | Al (5), Si (0.5), Fe (1) | 1.4 | 0.33 | +2.3 |
| Referential Example D | 94 | 4 | 2 | — | 2.1 | 0.44 | +5 |
| Referential Example 3-8 | 95.5 | 2 | 2 | Al (0.5) | 2.1 | 0.42 | −0.4 |

TABLE 4 summarizes the lattice constants a, the lattice constants c, and the crystallite sizes s of Examples 3-3~3-6 and Referential Example 3-8.

TABLE 4

|  | Lithium-transition metal oxide | | |
| --- | --- | --- | --- |
|  | Lattice constant a (Å) | Lattice constant c (Å) | Crystallite size s (Å) |
| Referential Example 3-1 | 2.865 | 14.19 | 700 |
| Example 3-2 | 2.866 | 14.18 | 662 |
| Example 3-3 | 2.870 | 14.19 | 454 |
| Example 3-4 | 2.873 | 14.21 | 521 |
| Referential Example C | 2.873 | 14.20 | 548 |
| Example 3-6 | 2.873 | 14.20 | 587 |
| Referential Example D | 2.875 | 14.21 | 607 |
| Referential Example 3-8 | 2.875 | 14.21 | 425 |

As can be understood from the results shown in TABLE 3, in all of Examples 3-2~3-6, the self-heat-generation starting temperature of the battery was increased, and the thermal stability of the cathode active material was improved.

Based on these results, it can be said that the thermal stability can be improved with a cathode active material having a lithium-transition metal oxide having a layered structure and containing Ni, Mn, and, optionally, Co, wherein a ratio of Ni with respect to a total amount of metal elements other than Li in the lithium-transition metal oxide is in a range of 75 mol %~95 mol %, a ratio of Mn with respect to the total amount of the metal elements other than Li in the lithium-transition metal oxide is greater than or equal to a ratio of Co with respect to the total amount of the metal elements other than Li in the lithium-transition metal oxide, the ratio of Co with respect to the total amount of the metal elements other than Li in the lithium-transition metal oxide is in a range of 0 mol %~2 mol %, a ratio of metal elements other than Li present in an Li layer of the layered structure is in a range of 1 mol %~2.5 mol % with respect to the total amount of the metal elements other than Li in the lithium-transition metal oxide, and a half-width n of a diffraction peak of a (208) plane of an X-ray diffraction pattern by X-ray diffraction in the lithium-transition metal oxide is in a range of $0.30° \leq n \leq 0.50°$.

The invention claimed is:

1. A cathode active material for a non-aqueous electrolyte secondary battery, comprising:
    a lithium-transition metal oxide having a layered structure and containing Ni, Mn, Co, and Al, wherein
    a ratio of Ni with respect to a total amount of metal elements other than Li in the lithium-transition metal oxide is in a range of 75 mol %~95 mol %,
    a ratio of Mn with respect to the total amount of the metal elements other than Li in the lithium-transition metal oxide is greater than or equal to a ratio of Co with respect to the total amount of the metal elements other than Li in the lithium-transition metal oxide,
    the ratio of Co with respect to the total amount of the metal elements other than Li in the lithium-transition metal oxide is in a range of 0.5 mol %~2 mol %,
    the lithium-transition metal oxide comprises at least one metal element selected from the group consisting of Fe, Mg, Si, Ti, Cr, Cu, Sn, Zr, Nb, Mo, Ta, W, Na, K, Ba, Sr, Bi, Be, Zn, Ca, and B, and
    a half-width n of a diffraction peak of a (208) plane of an X-ray diffraction pattern obtained by X-ray diffraction in the lithium-transition metal oxide is in a range of $0.30° \leq n \leq 0.50°$.

2. The cathode active material for the non-aqueous electrolyte secondary battery according to claim 1, wherein the ratio of Ni with respect to the total amount of the metal elements other than Li in the lithium-transition metal oxide is in a range of 85 mol %~95 mol %, and the half-width n of the diffraction peak of the (208) plane of the X-ray diffraction pattern obtained by X-ray diffraction in the lithium-transition metal oxide is in a range of $0.30° \leq n \leq 0.45°$.

3. The cathode active material for the non-aqueous electrolyte secondary battery according to claim 1, wherein the ratio of Ni with respect to the total amount of the metal elements other than Li in the lithium-transition metal oxide is in a range of 75 mol %~95 mol %, and the half-width n of the diffraction peak of the (208) plane of the X-ray diffraction pattern obtained by X-ray diffraction in the lithium-transition metal oxide is in a range of $0.37° \leq n \leq 0.45°$.

4. The cathode active material for the non-aqueous electrolyte secondary battery according to claim 1, wherein a lattice constant a indicating a length of an a axis of a crystal structure obtained by an analysis result of an X-ray diffraction pattern obtained by X-ray diffraction and a lattice constant c indicating a length of a c axis of the crystal structure in the lithium-transition metal oxide are in ranges of $2.867 \text{ Å} \leq a \leq 2.877 \text{ Å}$ and $14.18 \text{ Å} \leq c \leq 14.21 \text{ Å}$.

5. The cathode active material for the non-aqueous secondary battery according to claim 1, wherein a crystallite size s calculated by the Scherrer equation based on a half-width of a diffraction peak of a (104) plane of an X-ray diffraction pattern by X-ray diffraction in the lithium-transition metal oxide is in a range of $400 \text{ Å} \leq s \leq 600 \text{ Å}$.

6. A non-aqueous electrolyte secondary battery comprising:

a cathode including the cathode active material for the non-aqueous electrolyte secondary battery according to claim 1.

* * * * *